US012692004B2

(12) United States Patent
Coleman et al.

(10) Patent No.: US 12,692,004 B2
(45) Date of Patent: Jul. 28, 2026

(54) INTERCHANGEABLE AIR DISTRIBUTION COUPLING INTERFACE FOR AN INTERNAL CABIN OF A VEHICLE

(71) Applicant: THE BOEING COMPANY, Arlington, VA (US)

(72) Inventors: Matthew Stephen Coleman, Charleston, SC (US); Scott Damon LaForge, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 599 days.

(21) Appl. No.: 18/154,903

(22) Filed: Jan. 16, 2023

(65) Prior Publication Data

US 2024/0239490 A1     Jul. 18, 2024

(51) Int. Cl.
B64D 11/06          (2006.01)
B64D 13/00          (2006.01)

(52) U.S. Cl.
CPC .... B64D 11/0626 (2014.12); *B64D 2013/003* (2013.01)

(58) Field of Classification Search
CPC ...................... B64D 11/0626; B64D 2013/003
USPC ......................................................... 454/76
See application file for complete search history.

(56) References Cited

U.S. PATENT DOCUMENTS 5,556,332 A     9/1996   Schumacher
6,299,525 B1   10/2001   Scheffler 6,884,159 B1 *   4/2005   Ferraud, Jr. ........ B60H 1/00564
                                                           454/119
6,902,473 B1 *   6/2005   Goobeck ............ B60H 1/00592
                                                           454/903
7,022,011 B1 *   4/2006   Rickman ............. F24F 13/0218
                                                           454/903
8,539,787 B2 *   9/2013   Ebigt ........................ B60N 2/24
                                                           62/244
2006/0038074 A1   2/2006   Buhr
2006/0226649 A1  10/2006   Heuer
2013/0082138 A1   4/2013   Guering (Continued)

FOREIGN PATENT DOCUMENTS

CN          204775987       11/2015
FR          271742604        4/1996
FR            2894010        4/2009

(Continued)

OTHER PUBLICATIONS

Extended European Search Report for EP 232095245.0-1004, dated Apr. 24, 2024.

(Continued)

*Primary Examiner* — Avinash A Savani
*Assistant Examiner* — Dana K Tighe
(74) *Attorney, Agent, or Firm* — Joseph M. Butscher; Carroll, Hoette & Butscher, LLC

(57)                ABSTRACT

An air distribution coupling interface is configured to removably secure to a floor of an internal cabin of a vehicle. The air distribution coupling interface includes a main tube extending between an air inlet port and an air outlet port. The air inlet port is configured to couple to one or more conduits that are in fluid communication with an air distribution system. A securing flange is configured to removably secure the air distribution coupling interface to the floor of the internal cabin. The air outlet port is configured to deliver airflow provided by the air distribution system.

20 Claims, 9 Drawing Sheets

(56)　　　　　　References Cited

U.S. PATENT DOCUMENTS

2013/0149950 A1 *　6/2013　Umlauft ................. B64D 13/00
　　　　　　　　　　　　　　　　　　　454/76
2019/0368770 A1　12/2019　Hanus
2020/0231289 A1　7/2020　Hampe
2022/0135235 A1　5/2022　Space

OTHER PUBLICATIONS

English translation of CN 204775987.
Communication re EP App. No. 23209425.0-1009, dated Oct. 7, 2025.

* cited by examiner

INTERCHANGEABLE AIR DISTRIBUTION COUPLING INTERFACE FOR AN INTERNAL CABIN OF A VEHICLE

FIELD OF THE DISCLOSURE

Examples of the present disclosure generally relate to an interchangeable air distribution coupling interface for an internal cabin of a vehicle, such as a commercial aircraft.

BACKGROUND OF THE DISCLOSURE

Aircraft are used to transport passengers and cargo between various locations. Aircraft typically include an air distribution system that provides airflow within an internal cabin. Connection joints typically couple to conduits that connect to the air distribution system. The connection joints are typically permanently bonded to a surface of a floor of the internal cabin. Because the connection joints are permanently bonded to the floor, certain aspects of the internal cabin are not reconfigurable without extensive rework to remove the connection joint, and typically one or more floor panels on which the connection joint is secured. Additionally, known connection joints generally do not allow for future seat location provisions (for example, additional seating) without extensive modification to the floor. Overall, known connections joints hinder quick and easy reconfiguration of various aspects of an internal cabin of an aircraft.

SUMMARY OF THE DISCLOSURE

A need exists for an air distribution coupling interface that can be easily and efficiently selectively secured and unsecured from a floor of an internal cabin of a vehicle, such as a commercial aircraft. Further, a need exists for an air distribution coupling interface that allows for efficient reconfiguration of an internal cabin of a vehicle, such as a commercial aircraft.

With those needs in mind, certain examples of the present disclosure provide an air distribution coupling interface configured to removably secure to a floor of an internal cabin of a vehicle. The air distribution coupling interface includes a main tube extending between an air inlet port and an air outlet port. The air inlet port is configured to couple to one or more conduits that are in fluid communication with an air distribution system. A securing flange is configured to removably secure the air distribution coupling interface to the floor of the internal cabin. The air outlet port is configured to deliver airflow provided by the air distribution system.

The securing flange is not permanently bonded to the floor. In at least one example, the securing flange is configured to removably secure to the floor through one or more fasteners.

In at least one example, the air inlet port is configured to be underneath the floor when the air distribution coupling interface is secured to the floor. As a further example, the air outlet port is configured to deliver the airflow above the floor.

In at least one example, the main tube is arcuate.

In at least one example, a connection tube securable to the air outlet port. In at least one example, a cap is securable to the air outlet port. As a further example, the connection tube and the cap are interchangeably securable to the air outlet port.

In at least one example, the securing flange is configured to removably secure to a lower surface of the floor.

The air outlet port can be configured to deliver the airflow to a seat assembly within the internal cabin.

Certain examples of the present disclosure provide a method for removably securing an air distribution coupling interface to a floor of an internal cabin of a vehicle, wherein the air distribution coupling interface comprises a securing flange, and a main tube extending between an air inlet port and an air outlet port, the method includes coupling the air outlet port to one or more conduits that are in fluid communication with an air distribution system; removably securing, by the securing flange, the air distribution coupling interface to the floor; and delivering airflow, by the air outlet port, provided by the air distribution system.

Certain examples of the present disclosure provide a vehicle including an internal cabin, a floor within the internal cabin, and an air distribution coupling interface removably secured to the floor of the internal cabin, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, certain examples of the present disclosure provide an air distribution coupling interface that is configured to be in fluid communication with an air distribution system, such as via one or more conduits routed underneath a floor of an internal cabin of a vehicle. The air distribution coupling interface is removably secured to the floor, such as via one or more fasteners, snaps, an interference fit, and/or the like, instead of being permanently bonded to the floor. In this manner, the air distribution coupling interface is interchangeable. The air distribution coupling interface allows airflow to be provided to or proximate to a seat in a vehicle. Examples of the present disclosure provide an interchangeable through-floor air distribution coupling interface, which allows for both an installed seat at delivery to be connected to cabin air distribution and a seat to be hooked up to cabin air distribution in a post-delivery reconfiguration with minimum rework effort.

In at least one example, the air distribution coupling interface is secured to a floor of an internal cabin through fasteners and/or threaded inserts. The air distribution coupling interface includes a flange that may not protrude through the floorboard when installed. As such, the air distribution coupling interface allows for easy seat installation in relation to both pre- and post-delivery of a vehicle. As an example, the air distribution coupling interface may not be visible under a carpet if an operator of a vehicle chooses not to install a seat at a particular location. In contrast, if a seat is selected for installation post-delivery, the operator can simply remove a cap of the air distribution coupling interface, and install an extension, thereby providing an interface to an air distribution system with minimal rework.

The air distribution coupling interface, as described herein, allows seating configurations within an internal cabin of a vehicle, such as a commercial aircraft, to be efficiently and effectively updated in a cost-effective manner.

Figure 1:
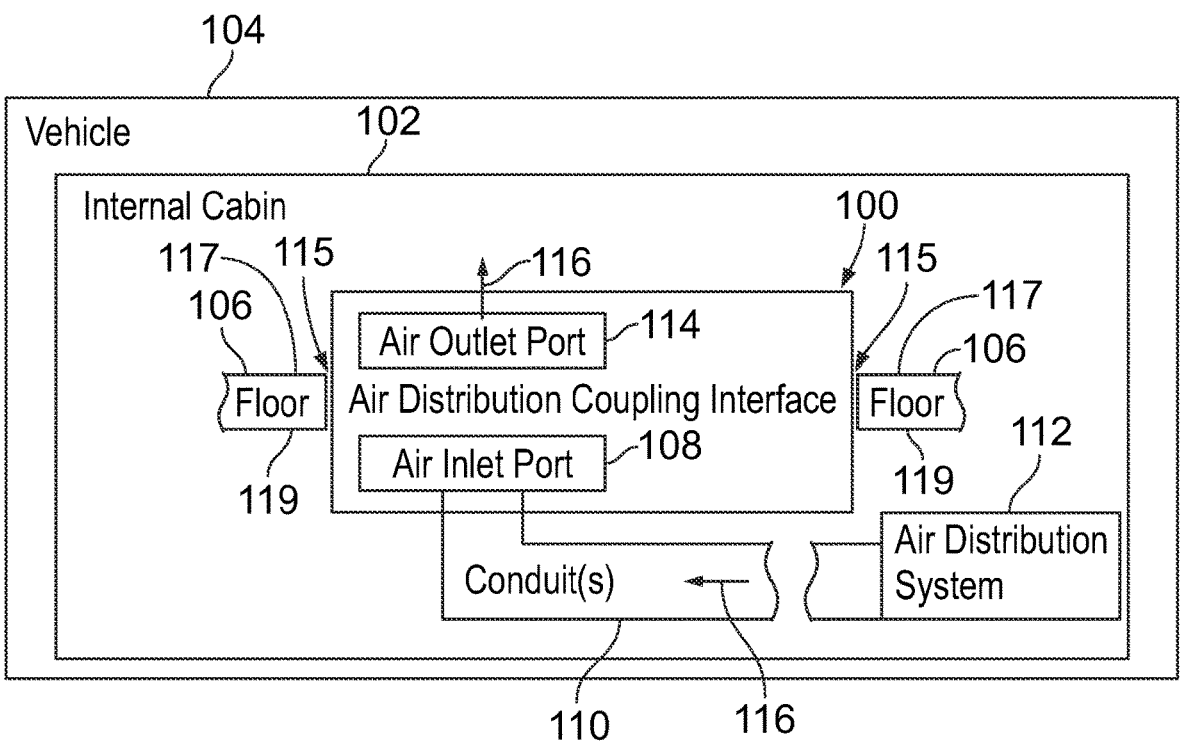
FIG. 1 illustrates a simplified block diagram of an air distribution coupling interface within an internal cabin of a vehicle, according to an example of the present disclosure.

FIG. 1 illustrates a simplified block diagram of an air distribution coupling interface 100 within an internal cabin 102 of a vehicle 104, according to an example of the present disclosure. In at least one example, the vehicle 104 is an aircraft, such as a commercial jet. Optionally, the vehicle 104 can be a land-based vehicle, such as an automobile, a bus, a train car, or the like. As another example, the vehicle 104 can be a watercraft. As another example, the vehicle 104 can be a spacecraft.

The air distribution coupling interface 100 is removably secured to a floor 106 of the internal cabin 102. For example, instead of being permanently bonded to the floor 106, the air distribution coupling interface 100 is removably secured to the floor 106 through one or more fasteners. As another example, the air distribution coupling interface 100 is snapably secured to the floor 106, such as via one or more detents, deflectable beams, or the like. As another example, the air distribution coupling interface 100 can include threads that removably couple to reciprocal threads surrounding an opening within the floor 106.

The air distribution coupling interface 100 includes an air inlet port 108, which can be underneath the floor 106. The air inlet port 108 fluidly couples to one or more conduits 110, such as one or more duct(s), tube(s), hoses, plenum(s), and/or the like, which fluidly couple to an air distribution system 112 of the vehicle 104. The air distribution system 112 can be or otherwise include a heating, ventilation, and air conditioning (HVAC) system, one or more air blowers, and/or the like. The air distribution system 112 is configured to provide conditioned, heated, circulated, and/or recirculated air to the internal cabin 102. The air distribution system 112 can be below the floor 106, above the floor 106, and/or supported on the floor 106. In at least one example, the conduit(s) 110 extend below the floor 106 and extend along a sidewall of the internal cabin 102.

The air distribution coupling interface 100 also includes an air outlet port 114, which can extend above the floor 106. Optionally, the air outlet port 114 can be flush with an upper surface of the floor 106. As another example, the air outlet port 114 can be recessed within the floor 106. Airflow 116 from the air distribution system is provided above the floor 106 by the air outlet port 114.

The air distribution coupling interface 100 can be selectively secured and removed from one or more reciprocal openings 115 within the floor 106. The reciprocal openings 115 can be located throughout the internal cabin 102, thereby allowing for airflow to be delivered to various locations, as desired. For example, the air distribution system 112 generates airflow 116, which is received by the air inlet port 108, and output through the air outlet port 114 at a desired location, such as underneath and/or to a seat assembly, within a monument (such as a galley, a closet, a lavatory, or the like), on or to sides of an aisle, and/or the like. If airflow 116 is not desired at a certain location, a cap can be secured over the air outlet port 114 to prevent the airflow 116 from passing out of the air outlet port 114. If the airflow 116 is desired at the location at a later time, the cap can be removed from the air outlet port 114.

Figure 2:
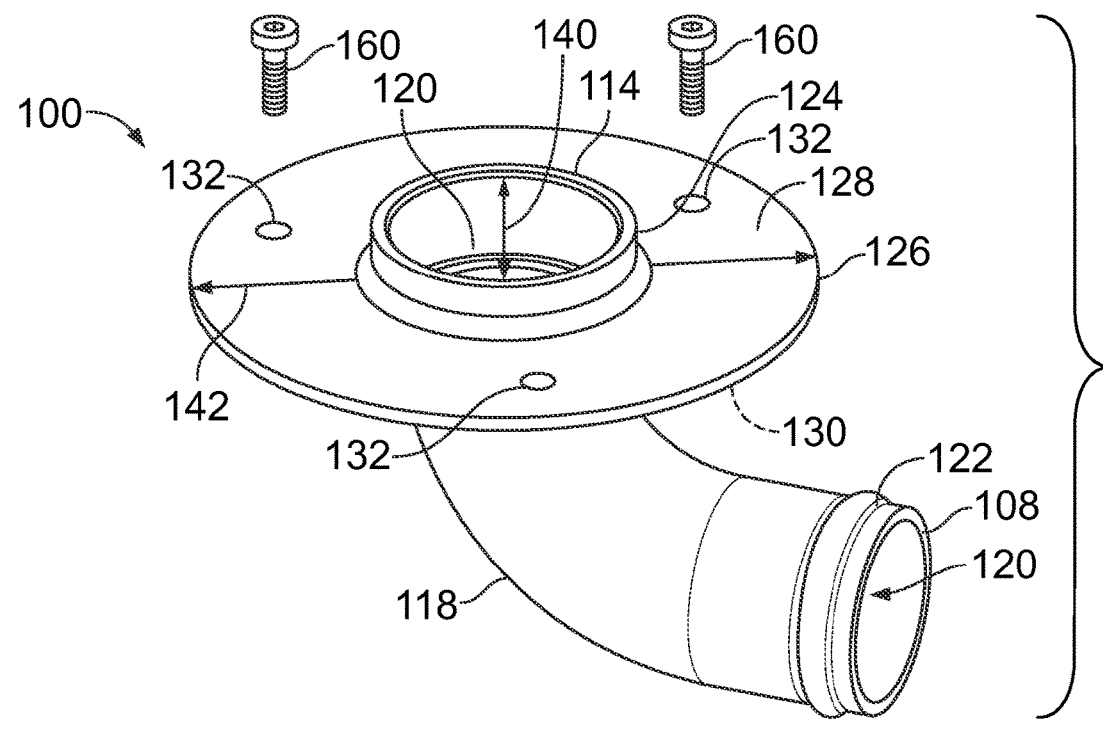
FIG. 2 illustrates an isometric top view of the air distribution coupling interface, according to an example of the present disclosure.
Figure 3:
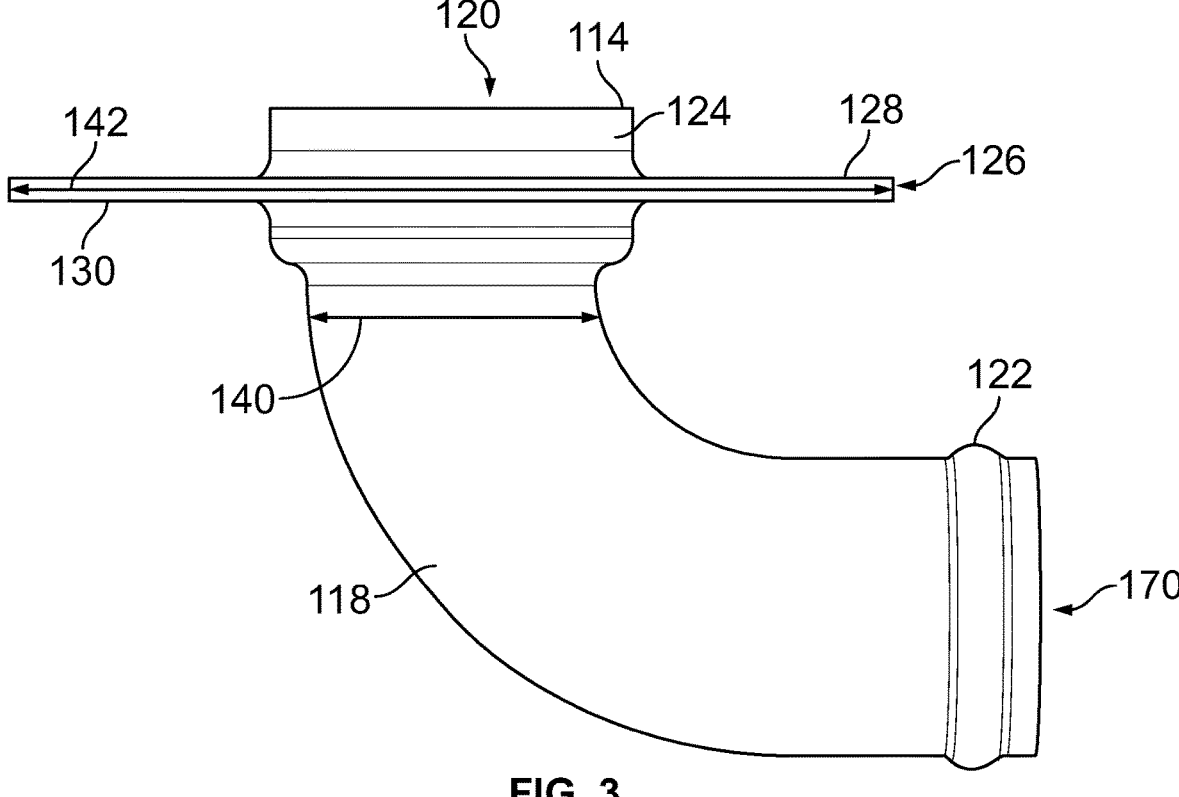
FIG. 3 illustrates a side view of the air distribution coupling interface of FIG. 2.

FIG. 2 illustrates an isometric top view of the air distribution coupling interface 100, according to an example of the present disclosure. FIG. 3 illustrates a side view of the air distribution coupling interface 100 of FIG. 2. Referring to FIGS. 1-3, the air distribution coupling interface 100 includes a main tube 118 defining an internal passage 120 extending between the air inlet port 108 and the air outlet port 114. The main tube 118 can be arcuate. For example, the main tube 118 has a smooth, curved shape without a right angle connection, thereby allowing for free and consistent fluid flow from the air inlet port 108 to the air outlet port 114.

The air inlet port 108 includes an outer fitting 122 configured to secure retain an end of a conduit 110, such as a hose, tube, duct, and/or the like. The air outlet port 114 includes an outer circumferential surface 124 that is configured to receive and retain a cap and a connection tube. In at least one example, the outer circumferential surface 124 can be threaded.

As shown, the air inlet port 108, the internal passage 120, and the air outlet port 114 can have circular cross-sections, in order to allow for free, efficient airflow therethrough. Optionally, the air inlet port 108, the internal passage 120, and the air outlet port 114 can be sized and shaped differently than shown.

In at least one example, the air distribution coupling interface 100 also includes a securing flange 126 radially and circumferentially extending around a portion of the main tube 118. The securing flange 126 is proximate to the air outlet port 114, such as less than 1 inch therefrom. The securing flange 126 is configured to removably secure the air distribution coupling interface 100 to the floor 106.

The securing flange 126 includes a first surface 128, such as an upper surface, facing toward the air outlet port 114, and an opposite second surface 130, such as a lower surface, facing away from the air outlet port 114. One or more fastener through-holes 132 are formed through the securing flange 126 between and through the first surface 128 and the second surface 130. The fastener through-holes 132 are configured to receive fasteners 160, such as screws, bolts, or the like that are used to secure the securing flange 126 (and therefore the air distribution coupling interface 100) to the floor 106.

The reciprocal opening 115 is formed through the floor 106 between and through an upper surface 117 and a lower surface 119. The reciprocal opening 115 can be a circular opening having a diameter. The diameter of the main tube 118 is smaller than the diameter of the reciprocal opening 115, thereby allowing the tube 118 to fit within the reciprocal opening 115. In contrast, the diameter of the securing flange 126 is greater than the diameter of the reciprocal opening 115, thereby preventing the securing flange 126 from passing into the reciprocal opening 115. Instead, the second surface 130 of the securing flange 126 can rest on top of the upper surface 117 of the floor 106 surrounding the reciprocal opening 115, while the portion of the main tube 118 below the securing flange 126 passes through the reciprocal opening 115, thereby disposing the air inlet port 108 underneath the floor 106. As another example, the first surface 128 of the securing flange 126 can abut against, and be secured to, the lower surface 119 of the floor 106, and the air outlet port 114 can extend upwardly into the reciprocal opening 115.

As a non-liming example, the diameter 140 of the main tube 118 can be 1.5 inches, and the diameter 142 of the securing flange is 4.5 inches. The diameter of the reciprocal opening 115 can be greater than 1.5 inches, but less than 4.5 inches. Optionally, the diameter 140 can be greater or less than 1.5 inches, the diameter 142 can be greater or less than 4.5 inches, and the diameter of the reciprocal opening 115 is greater than the diameter 140, but less than the diameter 142.

As noted, the securing flange 126 is removably securable to the floor 106, such as through one or more fasteners 160, such as one or more screw(s), bolt(s), or the like. Accordingly, the securing flange 126 is not permanently bonded to the floor 106. As another example, the main tube 118 and/or the securing flange 126 can be removably secured to the floor 106 through a snapable interface, an interference fit, a threaded engagement (such as a threadable interface between an outer surface of the main tube 118 or the securing flange 126 and an internal edge of the floor 106 surrounding the reciprocal opening 115), and/or the like.

As described herein, the air distribution coupling interface 100 is configured to removably secure to the floor 106 of the internal cabin 102 of the vehicle 104. The air distribution coupling interface 100 includes the main tube 118 extending between the air inlet port 108 and the air outlet port 114. The air inlet port 108 is configured to couple to one or more conduits 110 that are in fluid communication with the air distribution system 112. The securing flange 126 is configured to removably secure the air distribution coupling interface 100 to the floor 106 of the internal cabin 102. The air outlet port 114 is configured to deliver airflow provided by the air distribution system 112.

Figure 4:
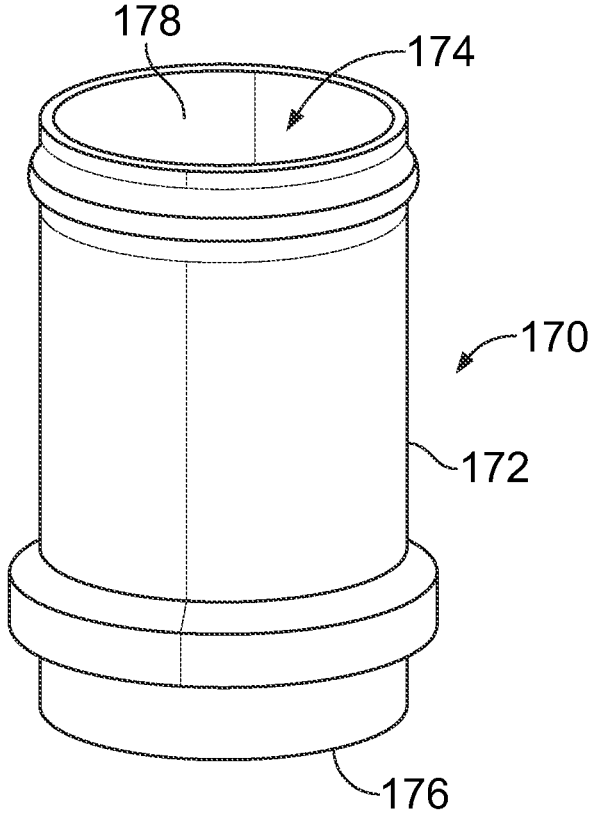
FIG. 4 illustrates an isometric top view of a connection tube, according to an example of the present disclosure.
Figure 5:
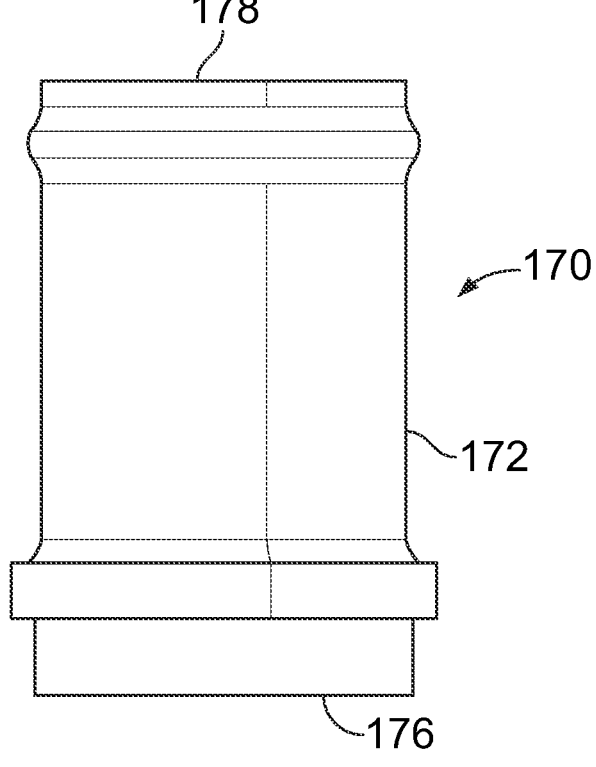
FIG. 5 illustrates a side view of the connection tube of FIG. 4.

FIG. 4 illustrates an isometric top view of a connection tube 170, according to an example of the present disclosure. FIG. 5 illustrates a side view of the connection tube 170 of FIG. 4. The connection tube 170 includes a main body 172 defining a central passage 174 between an inlet end 176 and an outlet end 178. Referring to FIGS. 2-5, the connection tube 170 is configured to secure to the air outlet port 114. For example, the inlet end 176 can fit around the air outlet port

114. As another example, the inlet end 176 can fit within the air outlet port 114. In at least one example, the inlet end 176 can threadably secure to the air outlet port 114. As another example, the inlet end 176 can snapably secure to the air outlet port 114. As another example, the inlet end 176 can secure to the air outlet port 114 through an interference fit. As another example, the inlet end 176 can be bonded to the air outlet port 114.

The connection tube 170 extends upwardly from the air outlet port 114, and provides a fitting for a conduit, such as a tube, hose, or the like, which can be used to channel airflow from the air distribution coupling interface 100 to a component, such as a portion of a seat assembly, a monument, or the like. As shown, the connection tube 170 can be straight and linear. Optionally, the connection tube 170 can be curved, include one or more bends, or the like.

Figures 6, 7:
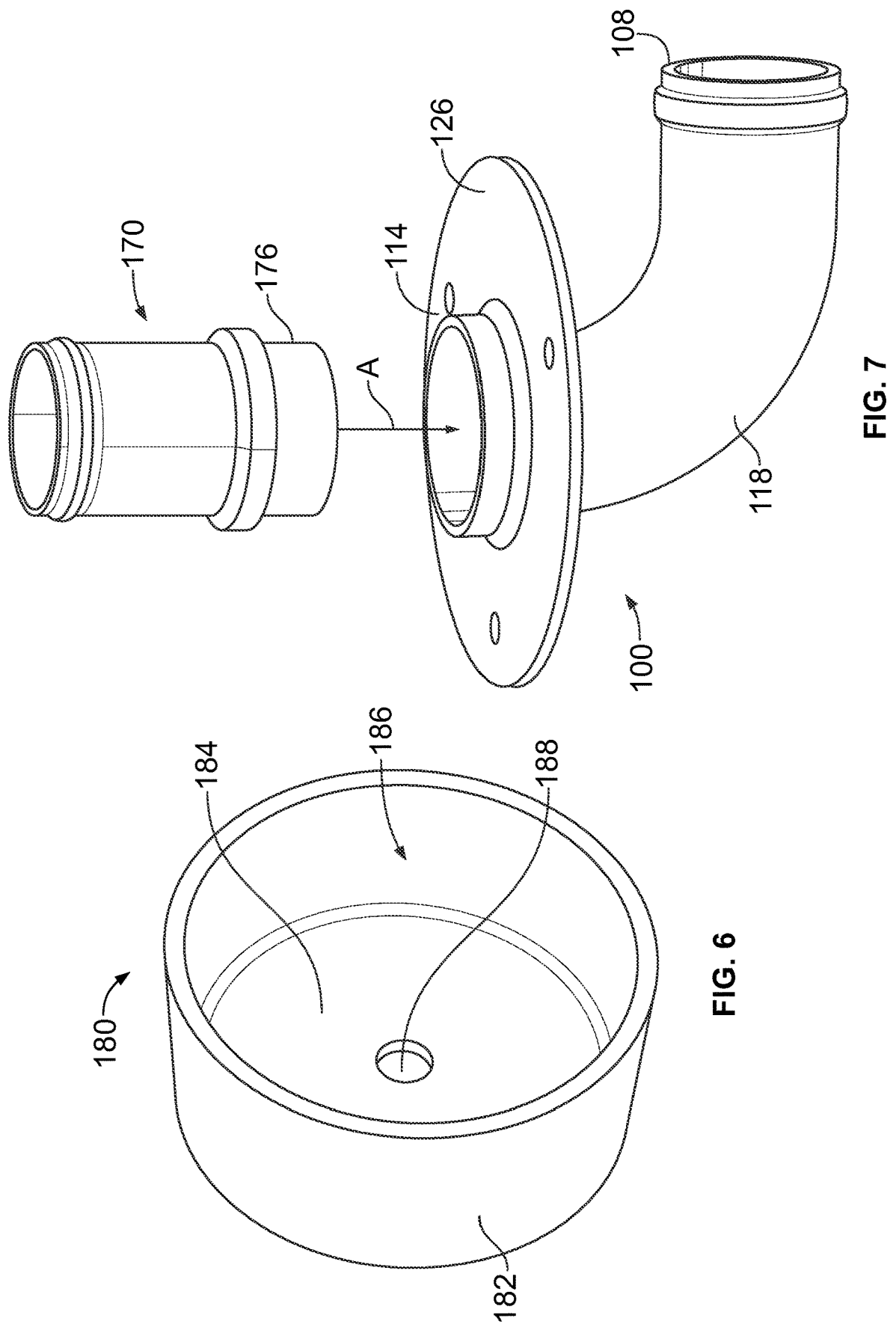
FIG. 6 illustrates an isometric bottom view of a cap, according to an example of the present disclosure.
FIG. 7 illustrates an isometric view of the connection tube aligned with an air outlet port of the air distribution coupling interface.

FIG. 6 illustrates an isometric bottom view of a cap 180, according to an example of the present disclosure. The cap 180 includes an outer circumferential wall 182 connected to a cover 184. An internal chamber 186 is defined between the outer circumferential wall 182 and the cover 184. As shown, the cover 184 can include an opening 188 that allows for a reduced amount of airflow to pass therethrough. Optionally, the cover 184 may not include the opening 188.

Referring to FIGS. 2, 3, and 6, the cap 180 is configured to be removably secured to the air outlet port 114. When secured to the air outlet port 114, the cap 180 prevents airflow (or allows a reduced amount of airflow) from passing out of the air outlet port 114. The cap 180 can fit around the air outlet port 114, or be configured to fit within the air outlet port 114 to provide a plug. In at least one example, the cap 180 can threadably secure to the air outlet port 114. As another example, the cap 180 can snapably secure to the air outlet port 114. As another example, the cap 180 can secure to the air outlet port 114 through an interference fit.

Referring to FIGS. 2-6, the cap 180 can be secured to the air outlet port 114. As desired, the cap 180 can be removed from the air outlet port 114, and the connection tube 170 can be subsequently secured to the air outlet port 114. The air distribution coupling interface 100 can be used in a variety of configurations, each of which can be changed, as desired. In one configuration, the air distribution coupling interface 100 can be used without the connection tube 170 or the cap 180. In another configuration, the air distribution coupling interface 100 can be used with the connection tube 170. In another configuration, the air distribution coupling interface 100 can be sued with the cap 180. Accordingly, the connection tube 170 and the cap 180 are interchangeably securable to the air outlet port 114.

FIG. 7 illustrates an isometric view of the connection tube 170 aligned with the air outlet port 114 of the air distribution coupling interface 100. As shown, in order to secure the connection tube 170 to the air outlet port 114, the connection tube 170 can be coaxially aligned with the air outlet port 114, and urged into the air outlet port 114 in the direction of arrow A. As shown, the inlet end 176 of the connection tube 170 can be configured to fit within the air outlet port 114.

Figure 8:
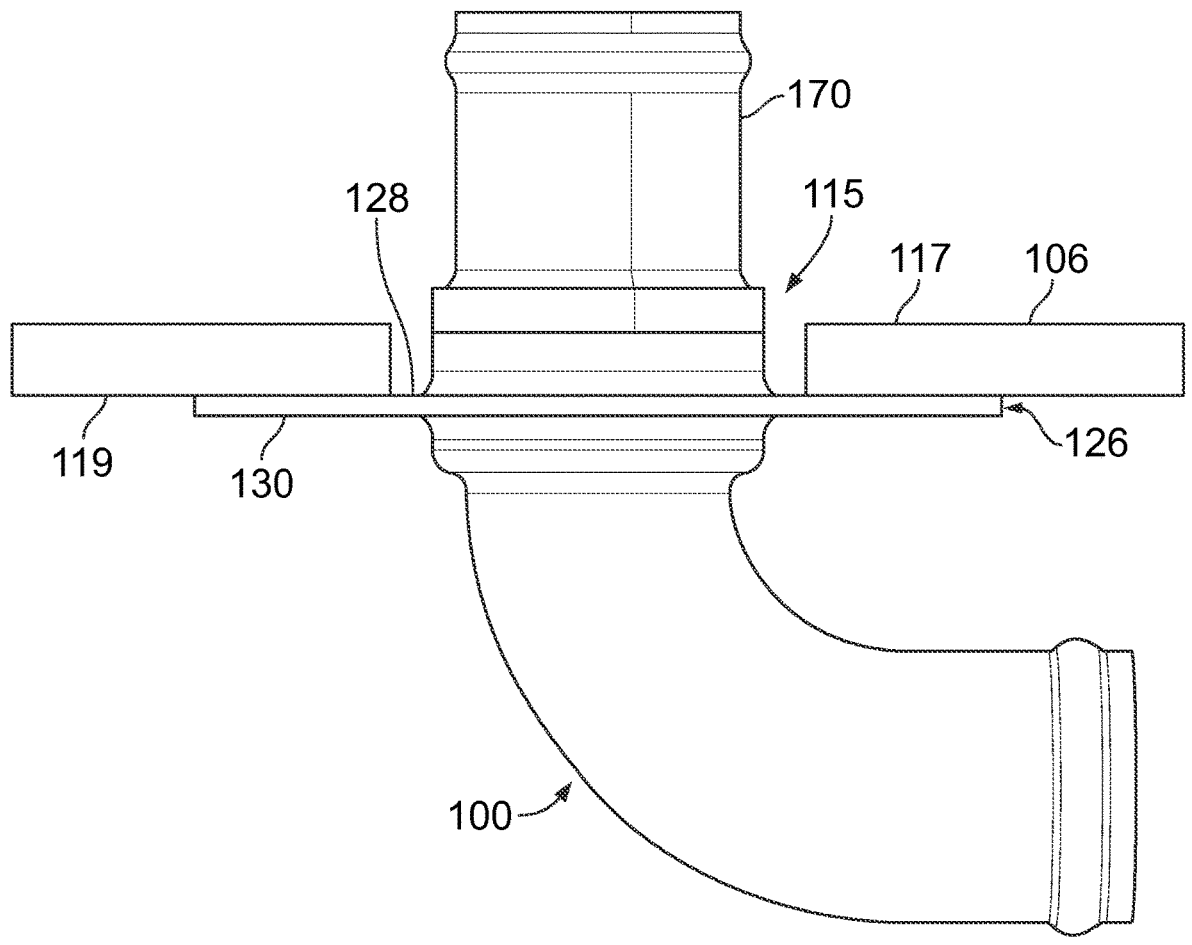
FIG. 8 illustrates a side view of the air distribution coupling interface having the connection tube secured to a floor, according to an example of the present disclosure.

FIG. 8 illustrates a side view of the air distribution coupling interface 100 having the connection tube 170 secured to the floor 106, according to an example of the present disclosure. The air outlet port 114 extends through the reciprocal opening 115. The first surface 128 of the securing flange 126 secures to the lower surface 119 of the floor 106, such as via the fasteners 160 (shown in FIG. 1). Because the securing flange 126 secures to the lower surface 119, the securing flange 126 does not protrude above the floor 106, thereby maintaining a smooth upper surface in relation to the floor 106. Further, by securing the securing flange 126 to the lower surface 119, fasteners may not extend to or otherwise affect the upper surface 117, thereby maintaining the aesthetics of a portion of the floor viewable by individuals within an internal cabin. Optionally, the second surface 130 of the securing flange 126 may be secured to the upper surface 117 of the floor 106.

Figures 9, 10:
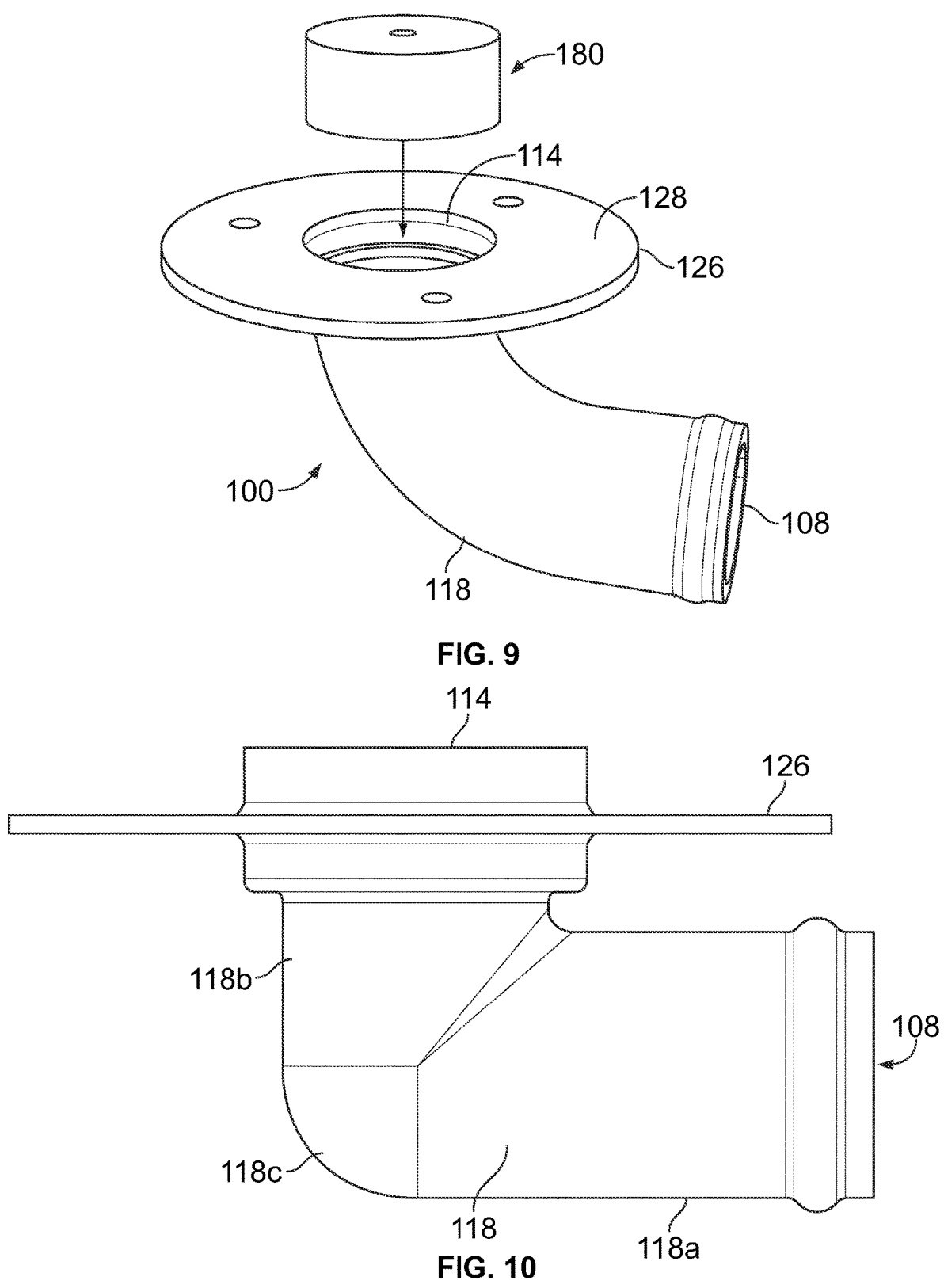
FIG. 9 illustrates an isometric view of the cap aligned with the air outlet port of the air distribution coupling interface.
FIG. 10 illustrates a side of an air distribution coupling interface, according to an example of the present disclosure.

FIG. 9 illustrates an isometric view of the cap 180 aligned with the air outlet port 114 of the air distribution coupling interface 100. As shown, the first surface 128 of the securing flange 126 can be flush with an upper edge of the air outlet port 114. The cap 180 can be configured to fit within the air outlet port 114, thereby providing a plug. In order to secure the cap 180 to the air outlet port 114, the connection cap 180 can be coaxially aligned with the air outlet port 114, and urged into the air outlet port 114 in the direction of arrow A.

FIG. 10 illustrates a side of an air distribution coupling interface 100, according to an example of the present disclosure. Instead of having an arcuate shape, the main tube 118 can have a first linear segment 118a connected to a second linear segment 118b at an angle joint 118c, such as a 90 degree angle.

Figure 11:
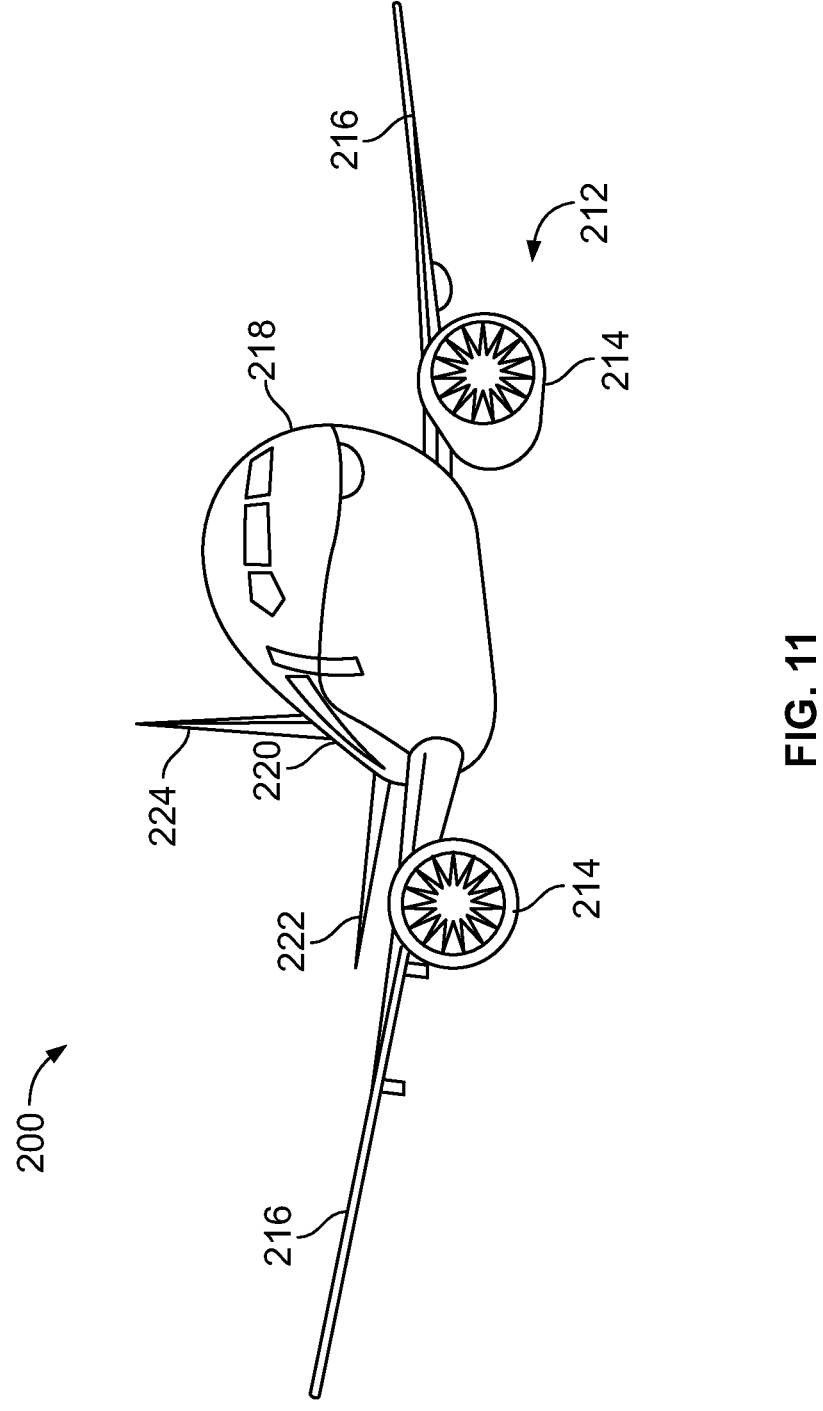
FIG. 11 illustrates a perspective front view of an aircraft, according to an example of the present disclosure.

FIG. 11 illustrates a perspective front view of an aircraft 200, according to an example of the present disclosure. The aircraft 200 is an example of the vehicle 104 shown in FIG. 1. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224. The fuselage 218 of the aircraft 200 defines an internal cabin, which includes a flight deck or cockpit, one or more work sections (for example, galleys, personnel carry-on baggage areas, and the like), one or more passenger sections (for example, first class, business class, and coach sections), one or more lavatories, and/or the like. FIG. 11 shows an example of an aircraft 200. It is to be understood that the aircraft 200 can be sized, shaped, and configured differently than shown in FIG. 11.

Figures 12A, 12B:
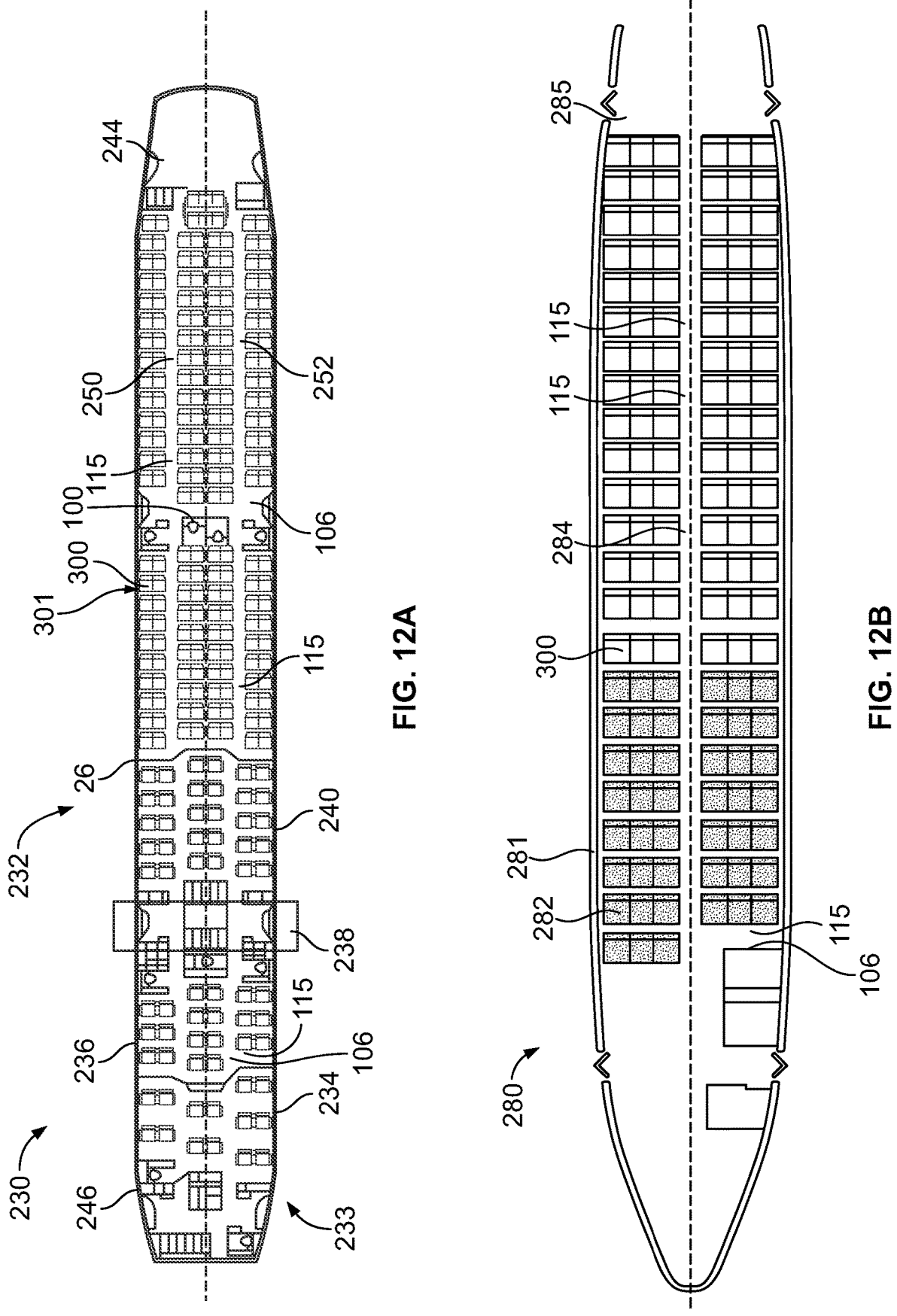
FIG. 12A illustrates a top plan view of an internal cabin of an aircraft, according to an example of the present disclosure.
FIG. 12B illustrates a top plan view of an internal cabin of an aircraft, according to an example of the present disclosure.

FIG. 12A illustrates a top plan view of an internal cabin 230 of an aircraft, according to an example of the present disclosure. The internal cabin 230 may be within a fuselage 232 of the aircraft. For example, one or more fuselage walls may define an interior of the internal cabin 230. The interior of the internal cabin 230 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 230.

The internal cabin 230 includes multiple sections, including a front section 233, a first class section 234, a business class section 236, a front galley station 238, an expanded economy or coach section 240, a standard economy or coach section 242, and an aft section 244, which may include multiple lavatories and galley stations. It is to be understood that the internal cabin 230 may include more or less sections than shown. For example, the internal cabin 230 may not include a first class section, and may include more or less galley stations than shown.

As shown in FIG. 12A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

Seat assemblies 300 are positioned throughout the internal cabin 230. The seat assemblies 300 may be arranged in rows 301. Reciprocal openings 115 may be formed within the floor 106 throughout the internal cabin 230. The reciprocal openings 115 can be within rows 301, aisles 250 and 252, disposed to sides of the aisles 250 and 252, underneath the seat assemblies 300, and/or the like. Referring to FIGS. 1-12A, air distribution coupling interfaces 100 can be removably secured to the reciprocal openings 115.

FIG. 12B illustrates a top plan view of an internal cabin 280 of an aircraft, according to an example of the present disclosure. The internal cabin 280 may be within a fuselage 281 of the aircraft. For example, one or more fuselage walls may define the interior of the internal cabin 280. The internal cabin 280 includes multiple sections, including a main cabin 282 having passenger seat assemblies 300, and an aft section 285 behind the main cabin 282. It is to be understood that the internal cabin 280 may include more or less sections than shown.

The internal cabin 80 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280. Reciprocal openings 115 may be formed within the floor 106 throughout the internal cabin 280.

Figure 13:
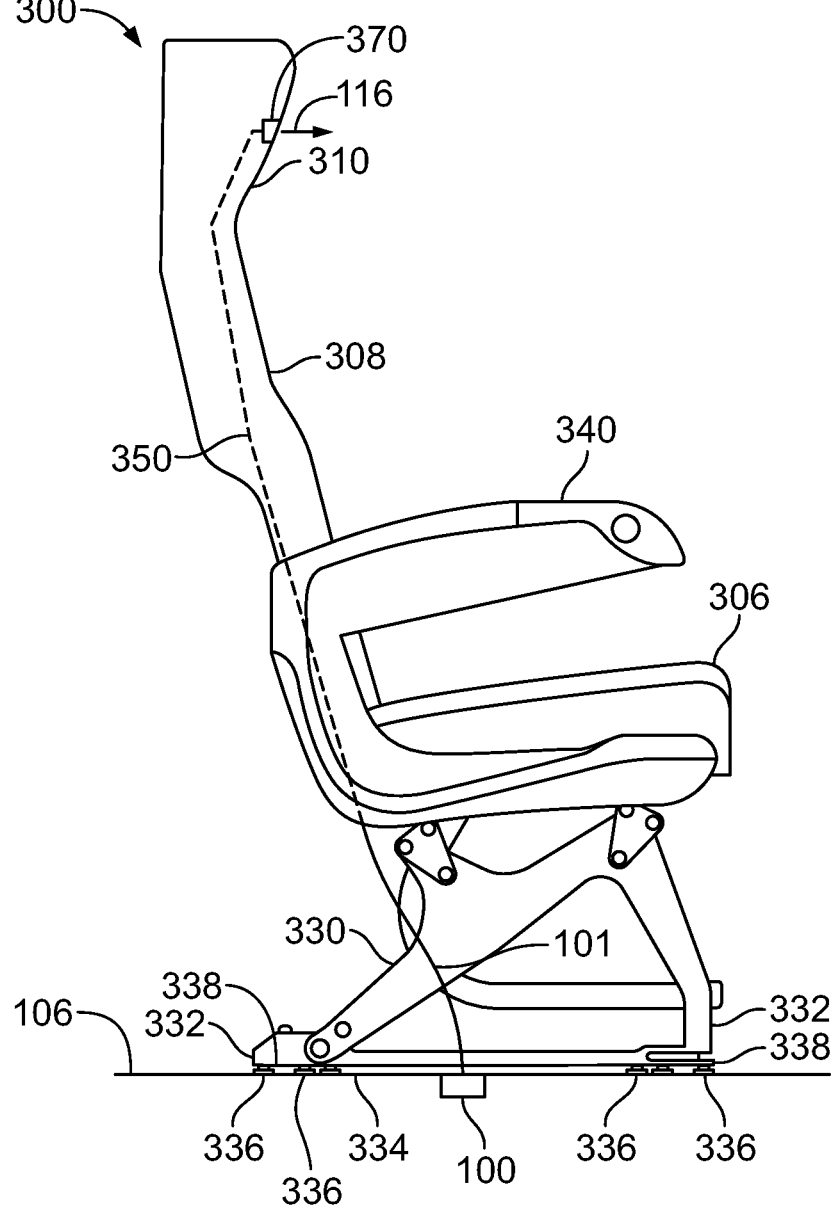
FIG. 13 illustrates a side view of a seat assembly, according to an example of the present disclosure.

FIG. 13 illustrates a side view of a seat assembly 300, according to an example of the present disclosure. The seat assembly 300 is configured to be secured within an internal cabin of a vehicle, such as a commercial aircraft.

The seat assembly 300 includes a base 330, which may include legs 332 that may be secured to seat tracks 334 secured to a floor 106 within a cabin of a vehicle. In at least one example, securing studs 336 (such as shear studs) downwardly extend from lower surfaces 338 of the legs 332. The securing studs 336 are securely retained within the seat tracks 334. The seat tracks 334 are configured to securely couple to the securing studs 336 to secure the seat assembly 300 in place. The base 330 supports a seat cushion 306 and a backrest 308, which includes a headrest 310. Arm rests 340 may be pivotally secured to the backrest 308.

An air distribution coupling interface 100 is secured the floor 106, as described herein. Referring to FIGS. 1 and 13, a conduit 110 is secured to the air outlet port 114 and is in fluid communication with an air circuit 350, including one or more conduits, extending on and/or within the seat assembly 300. The air circuit 350 is also in fluid communication with one or more air outlets 370, such as nozzles, that allow the airflow 116 provided by the air distribution system 112, and through the air distribution coupling interface 100, to pass to a seated passenger. As shown, the air outlets 370 can be provided on or within the headrest 310.

The seat assembly 300 may be sized and shaped differently than shown in FIG. 13. The seat assembly 300 may include more or less components than shown in FIG. 13. It is to be understood that the seat assembly 300 shown in FIG. 13 is merely one example of a seat assembly that may be disposed within an internal cabin of a vehicle.

Further, the disclosure comprises examples according to the following clauses:

Clause 1. An air distribution coupling interface configured to removably secure to a floor of an internal cabin of a vehicle, the air distribution coupling interface comprising:

a main tube extending between an air inlet port and an air outlet port, wherein the air inlet port is configured to couple to one or more conduits that are in fluid communication with an air distribution system; and a securing flange configured to removably secure the air distribution coupling interface to the floor of the internal cabin, wherein the air outlet port is configured to deliver airflow provided by the air distribution system.

Clause 2. The air distribution coupling interface of Clause 1, wherein the securing flange is not permanently bonded to the floor.

Clause 3. The air distribution coupling interface of Clauses 1 or 2, wherein the securing flange is configured to removably secure to the floor through one or more fasteners.

Clause 4. The air distribution coupling interface of any of Clauses 1-3, wherein the air inlet port is configured to be underneath the floor when the air distribution coupling interface is secured to the floor.

Clause 5. The air distribution coupling interface of Clause 4, wherein the air outlet port is configured to deliver the airflow above the floor.

Clause 6. The air distribution coupling interface of any of Clauses 1-5, wherein the main tube is arcuate.

Clause 7. The air distribution coupling interface of any of Clauses 1-6, further comprising a connection tube securable to the air outlet port.

Clause 8. The air distribution coupling interface of any of Clauses 1-7, further comprising a cap securable to the air outlet port.

Clause 9. The air distribution coupling interface of any of Clauses 1-8, wherein a connection tube and a cap are interchangeably securable to the air outlet port.

Clause 10. The air distribution coupling interface of any of Clauses 1-9, wherein the securing flange is configured to removably secure to a lower surface of the floor.

Clause 11. The air distribution coupling interface of any of Clauses 1-10, wherein the air outlet port is configured to deliver the airflow to a seat assembly within the internal cabin.

Clause 12. A method for removably securing an air distribution coupling interface to a floor of an internal cabin of a vehicle, wherein the air distribution coupling interface comprises a securing flange, and a main tube extending between an air inlet port and an air outlet port, the method comprising:

coupling the air outlet port to one or more conduits that are in fluid communication with an air distribution system;

removably securing, by the securing flange, the air distribution coupling interface to the floor; and delivering airflow, by the air outlet port, provided by the air distribution system.

Clause 13. The method of Clause 12, wherein said removably securing comprises removably securing the securing flange to the floor through one or more fasteners.

Clause 14. The method of Clauses 12 or 13, wherein the air inlet port is underneath the floor when the air distribution coupling interface is secured to the floor, and wherein the air outlet port delivers the airflow above the floor.

Clause 15. The method of any of Clauses 12-14, further comprising securing a connection tube to the air outlet port.

Clause 16. The method of any of Clauses 12-15, further comprising securing a cap to the air outlet port.

Clause 17. The method of any of Clauses 12-16, further comprising interchangeably securing a connection tube and a cap to the air outlet port.

Clause 18. The method of any of Clauses 12-17, wherein said removably securing comprises removably the securing flange to a lower surface of the floor.

Clause 19. The method of any of Clauses 12-18, wherein said delivering comprises delivering the airflow to a seat assembly within the internal cabin.

Clause 20. A vehicle comprising:

an internal cabin;

a floor within the internal cabin; and an air distribution coupling interface removably secured to the floor of the internal cabin, the air distribution coupling interface comprising:

a main tube extending between an air inlet port and an air outlet port, wherein the air inlet port couples to one or more conduits that are in fluid communication with an air distribution system, and wherein the air inlet port is underneath the floor when the air distribution coupling interface is secured to the floor; and a securing flange that removably secures the air distribution coupling interface to the floor of the internal cabin, wherein the air outlet port delivers airflow provided by the air distribution system above the floor, and wherein the securing flange is not permanently bonded to the floor;

a connection tube securable to the air outlet port; and a cap securable to the air outlet port, wherein the connection tube and the cap are interchangeably securable to the air outlet port.

As described herein, examples of the present disclosure provide an air distribution coupling interface that can be easily and efficiently selectively secured and unsecured from a floor of an internal cabin of a vehicle, such as a commercial aircraft. Further, example of the present disclosure provide an air distribution coupling interface that allows for efficient reconfiguration of an internal cabin of a vehicle, such as a commercial aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." More-
over, the terms "first," "second," and "third," etc. are used
merely as labels, and are not intended to impose numerical
requirements on their objects. Further, the limitations of the
following claims are not written in means-plus-function
format and are not intended to be interpreted based on 35
U.S.C. § 112(f), unless and until such claim limitations
expressly use the phrase "means for" followed by a state-
ment of function void of further structure.

This written description uses examples to disclose the
various examples of the disclosure, including the best mode,
and also to enable any person skilled in the art to practice the
various examples of the disclosure, including making and
using any devices or systems and performing any incorpo-
rated methods. The patentable scope of the various examples
of the disclosure is defined by the claims, and can include
other examples that occur to those skilled in the art. Such
other examples are intended to be within the scope of the
claims if the examples have structural elements that do not
differ from the literal language of the claims, or if the
examples include equivalent structural elements with insub-
stantial differences from the literal language of the claims.

What is claimed is:

1. An air distribution coupling interface configured to
removably secure to a floor of an internal cabin of a vehicle,
the air distribution coupling interface comprising:
    a main tube extending between an air inlet port and an air
        outlet port, wherein the air inlet port is configured to
        couple to one or more conduits that are in fluid com-
        munication with an air distribution system;
    a securing flange permanently fixed to the main tube,
        wherein the securing flange radially and circumferen-
        tially extends around a portion of the main tube, the
        securing flange configured to removably secure the air
        distribution coupling interface to the floor of the inter-
        nal cabin, wherein the securing flange comprises fas-
        tener-through holes, and wherein the air outlet port is
        configured to deliver airflow provided by the air dis-
        tribution system; and
    fasteners, wherein the fastener-through holes are config-
        ured to receive and retain the fasteners, and wherein the
        fasteners are configured to removably secure the secur-
        ing flange to the floor.

2. The air distribution coupling interface of claim 1,
wherein the securing flange is not permanently bonded to the
floor.

3. The air distribution coupling interface of claim 1,
wherein the fasteners are screws or bolts.

4. The air distribution coupling interface of claim 1,
wherein the air inlet port is configured to be underneath the
floor when the air distribution coupling interface is secured
to the floor.

5. The air distribution coupling interface of claim 4,
wherein the air outlet port is configured to deliver the airflow
above the floor.

6. The air distribution coupling interface of claim 1,
wherein the main tube includes a fixed arcuate portion.

7. The air distribution coupling interface of claim 1,
further comprising a connection tube securable to the air
outlet port.

8. The air distribution coupling interface of claim 1,
further comprising a cap securable to the air outlet port,
wherein the cap includes an outer circumferential wall
connected to a cover, wherein an internal chamber is defined
between the outer circumferential wall and the cover, and
wherein the cover includes an opening that allows for a
reduced amount of airflow to pass therethrough.

9. The air distribution coupling interface of claim 1,
wherein a connection tube and a cap are interchangeably
securable to the air outlet port.

10. The air distribution coupling interface of claim 1,
wherein the securing flange is configured to removably
secure to a lower surface of the floor.

11. The air distribution coupling interface of claim 1,
wherein the air outlet port is configured to deliver the airflow
to a seat assembly within the internal cabin.

12. A method for removably securing an air distribution
coupling interface to a floor of an internal cabin of a vehicle,
wherein the air distribution coupling interface comprises a
securing flange, and a main tube extending between an air
inlet port and an air outlet port, wherein the securing flange
is permanently fixed to the main tube, and wherein the
securing flange radially and circumferentially extends
around a portion of the main tube, the method comprising:
    coupling the air outlet port to one or more conduits that
        are in fluid communication with an air distribution
        system;
    removably securing, by the securing flange, the air dis-
        tribution coupling interface to the floor, wherein said
        removably securing comprises inserting fasteners into
        fastener through-holes of the securing flange, and
        securing the securing flange to the floor by the fasten-
        ers; and
    delivering airflow, by the air outlet port, provided by the
        air distribution system.

13. The method of claim 12, wherein the fasteners com-
prises screws or bolts.

14. The method of claim 12, wherein the air inlet port is
underneath the floor when the air distribution coupling
interface is secured to the floor, and wherein the air outlet
port delivers the airflow above the floor.

15. The method of claim 12, further comprising securing
a connection tube to the air outlet port.

16. The method of claim 12, further comprising securing
a cap to the air outlet port.

17. The method of claim 12, further comprising inter-
changeably securing a connection tube and a cap to the air
outlet port.

18. The method of claim 12, wherein said removably
securing comprises removably securing the securing flange
to a lower surface of the floor.

19. The method of claim 12, wherein said delivering
comprises delivering the airflow to a seat assembly within
the internal cabin.

20. A vehicle comprising:
    an internal cabin;
    a floor within the internal cabin; and
    an air distribution coupling interface removably secured
        to the floor of the internal cabin, the air distribution
        coupling interface comprising:
        a main tube extending between an air inlet port and an
            air outlet port, wherein the air inlet port couples to
            one or more conduits that are in fluid communication
            with an air distribution system, and wherein the air
            inlet port is underneath the floor when the air distri-
            bution coupling interface is secured to the floor; and
        a securing flange permanently fixed to the main tube,
            wherein the securing flange radially and circumfer-
            entially extends around a portion of the main tube,
            the securing flange removably secures the air distri-
            bution coupling interface to the floor of the internal
            cabin, wherein the securing flange comprises fas-
            tener-through holes, wherein the air outlet port deliv-
            ers airflow provided by the air distribution system above the floor, and wherein the securing flange is not permanently bonded to the floor;

fasteners, wherein the fastener-through holes receive and retain the fasteners, and wherein the fasteners removably secure the securing flange to the floor;

a connection tube securable to the air outlet port; and a cap securable to the air outlet port, wherein the connection tube and the cap are interchangeably securable to the air outlet port.

* * * * *